June 21, 1966  J. E. ROBERTSON  3,257,126
COLLET-TYPE SOCKET HITCH
Filed Sept. 23, 1964  2 Sheets-Sheet 1
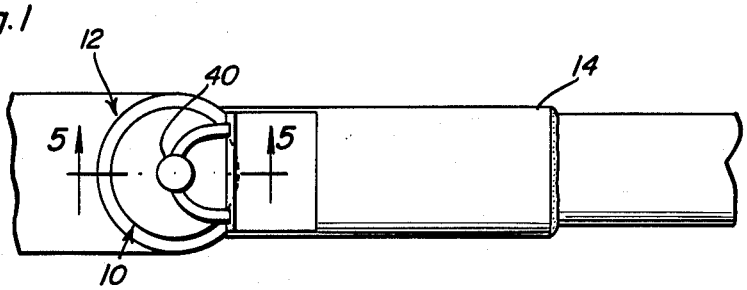
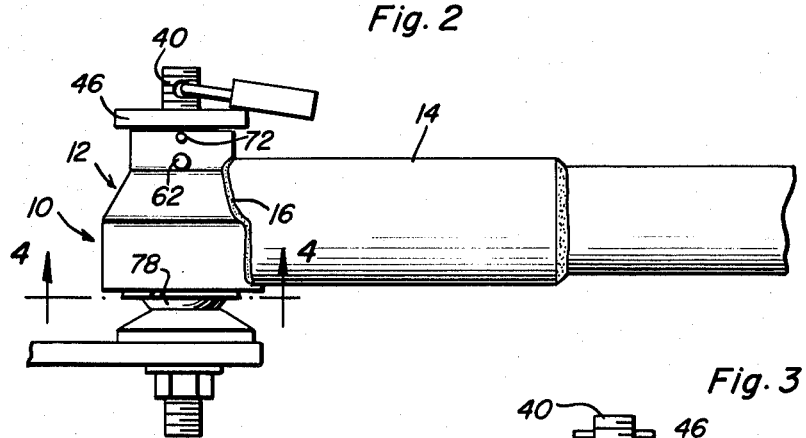
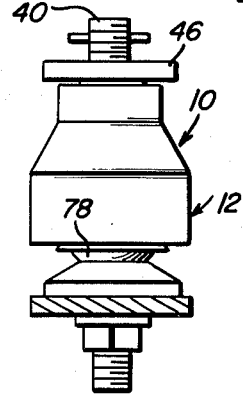
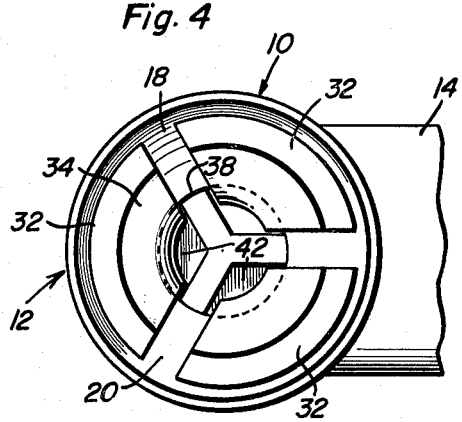
Jesse E. Robertson
INVENTOR.

June 21, 1966  J. E. ROBERTSON  3,257,126
COLLET-TYPE SOCKET HITCH
Filed Sept. 23, 1964  2 Sheets-Sheet 2
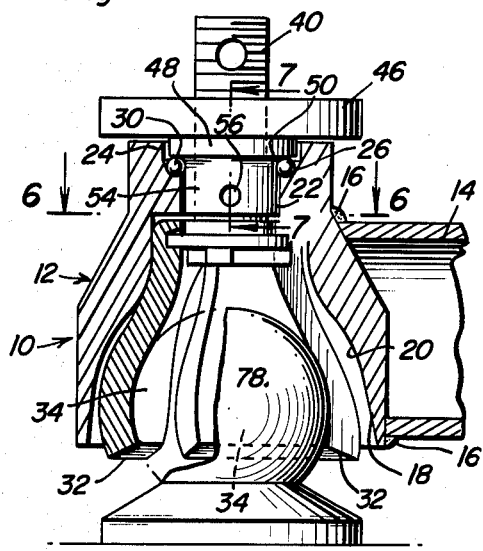
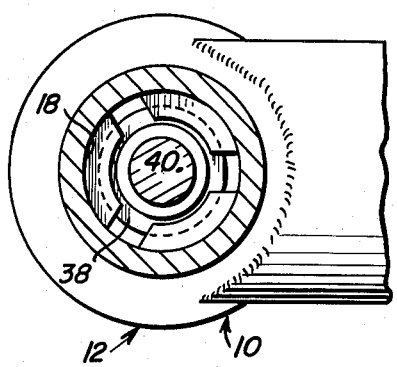
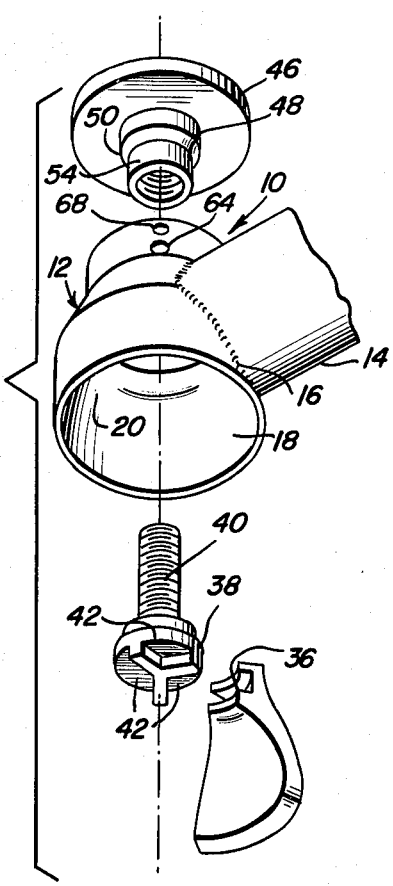
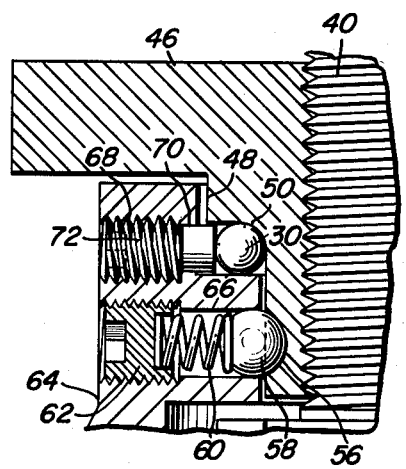
Jesse E. Robertson
INVENTOR.

# United States Patent Office 3,257,126
Patented June 21, 1966

3,257,126
COLLET-TYPE SOCKET HITCH
Jesse E. Robertson, % R. L. Herring, Rte. 2, Miles, Tex.
Filed Sept. 23, 1964, Ser. No. 398,545
3 Claims. (Cl. 280—511)

This invention relates to a novel and useful collet-type socket hitch and more specifically to a hitch construction including structural components defining a radially expandable and contractible hemispherical socket for receiving a ball-type hitch element.

The collet-type socket hitch of the instant invention is designed to be utilized in conjunction with conventional forms of ball hitch elements and includes means for receiving a conventional ball-type hitch element in a manner so that the ball hitch element may be swivelled relative to the socket hitch of the instant invention and the ball hitch element may not be withdrawn from the socket hitch element of the instant invention without the socket hitch element being adjusted for its withdrawal.

The collet-type hitch of the instant invention includes a body portion which is adapted to be supported from the forward end of the trailer tongue and which includes a downwardly opening recess having downwardly divergent walls and a plurality of collet segments disposed in and spaced circumferentially about the recess with the segments including coacting inwardly facing surfaces which together form a generally hemispherical socket. The collet segments are movable vertically in the downwardly opening recess formed in the body portion and the segments, when raised in the recess, coact with the downwardly divergent walls of the recess so as to be cammed inwardly thereby enabling the hemispherical socket formed between the coacting inwardly facing surfaces of the segments to be radially inwardly contracted.

Means is provided for simultaneously raising and lowering the segments relative to the body portion and accordingly a single actuator is all that is required to cause simultaneous vertical movement of the collet segments within the recess to cause the hemispherical socket formed thereby to be either radially expanded or contracted.

The main object of this invention is to provide a collet type of socket hitch construction whereby the collet segments thereof may be more precisely adjusted so as to define a generally hemispherical socket formed thereby to be either radially expanded or contracted.

The main object of this invention is to provide a collet type of socket hitch construction whereby the collet segments thereof may be more precisely adjusted so as to define a generally hemispherical socket for the reception of a ball-type hitch element and for the retention of a ball hitch element within the socket while maintaining a universal connection between the ball hitch element and the socket and a minimum amount of clearance between the ball hitch element and the portions of the collet-type socket hitch defining the generally hemispherical socket in which the ball element is received.

Another object of this invention is to provide a collet-type socket hitch which will be readily adaptable to manufacture in various sizes.

Still another object of this invention is to provide a socket hitch construction including actuating members that may be readily manipulated by the user of the collet-type socket hitch.

Still another object of this invention is to provide a collet-type socket hitch construction which will be capable of functioning properly with at least two different size ball hitch elements.

A final object of this invention to be specifically enumerated herein is to provide a collet-type socket hitch which will conform to conventional forms of manufacture, be of simple construction and easy to use so as to provide a device that will be economically feasible, long lasting and relatively troublefree in operation.

These together with other object and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the collet-type socket hitch of the instant invention shown operatively associated with the ball hitch construction of a towing vehicle;

FIGURE 2 is a side elevational view of the embodiment illustrated in FIGURE 1;

FIGURE 3 is an end elevational view of the assembly illustrated in FIGURE 2 and as seen from the left side thereof;

FIGURE 4 is an enlarged horizontal sectional view taken substantially upon the plane indicated by the section line 4—4 of FIGURE 2;

FIGURE 5 is an enlarged fragmentary vertical sectional view taken substantially upon the plane indicated by the section line 5—5 of FIGURE 1;

FIGURE 6 is a horizontal sectional view taken substantially upon the plane indicated by the section line 6—6 of FIGURE 5;

FIGURE 7 is a fragmentary enlarged vertical sectional view taken substantially upon the plane indicated by the section line 7—7 of FIGURE 5; and FIGURE 8 is an exploded perspective view of the collet-type socket hitch with two of the collet segments not being shown.

Referring now more specifically to the drawings the numeral 10 generally designates the collet-type socket hitch of the instant invention. The hitch 10 includes a body portion generally referred to by the reference numeral 12 which is secured to the forward end of the trailer tongue 14 in any convenient manner such as by welding 16. The body portion 12 defines a downwardly opening recess 18 including downwardly divergent side walls 20, the recess 16 comprising the lower end of an upstanding bore 22 formed through the body portion 12.

The upper end of the bore 22 includes a counterbore 24 and the shoulder 26 between the counterbore 24 and the bore 22 defines a bearing race in which a plurality of ball bearings 30 are disposed.

A plurality of collet segments 32 are disposed in and spaced circumferentially about the recess 18. The segments 32 are vertically movable in the recess 18 and include coacting inwardly facing surfaces 34 which together define a generally hemispherical pocket.

The upper ends of the segments 32 include inwardly facing recesses 36 and a diametrically enlarged head portion 38 carried by the lower end of an externally threaded shank portion 40 includes flange portions 42 which are receivable in the corresponding recesses 36 whereby vertical movement of the shank portions 40 through the bore 22 will cause the collet segments 32 to be raised in the recess 18.

A threaded fastener 46 is threadedly engaged with the upper end portion of the threaded shank 42 which projects through the bore 22 and the counterbore 24. The threaded fastener 46 includes a shoulder portion 48 whose undersurface 50 defines a bearing race opposing the bearing race 26 and engaged by the ball bearings 30. Still further, the diametrically reduced lower end portion 54 of the threaded fastener 46 includes a radially outwardly opening recess 56 in which a ball detent 58 is yieldingly urged by means of a compression spring 60. The compression spring 60 is backed by a removable plug 62 threadedly engaged in a threaded counterbore 64 of a transverse bore 66 opening into the bore 22. The ball detent 58 may of course be utilized to yieldingly maintain the fastener 46 in adjusted rotated positions. Thus, once the hemispherical socket defined between the collet segments 32 has been radially contracted the desired amount the recess 56 may be registered with the ball detent 58 in order that the latter may be seated in the former so as to prevent unwanted rotation of the threaded fastener 46.

The bearing race 26 is communicated with the exterior of the body portion 12 by means of a transverse threaded counterbore 68 of the transverse bore 70 which opens into the counterbore 24. The removable plug 72 is threadedly engaged in the counterbore 68 and prevents the ball bearings 30 from being removed through the bore 70 and the counterbore 68.

When the shank portion 40 is allowed to drop relative to the body portion 12, the collet segments 32 move away from the downwardly divergent surfaces 20 of the recess 18 and accordingly may be spread apart so as to accommodate the upper end portion of the ball hitch element 78. Then, with the weight of the trailer tongue 14 resting upon the ball hitch element 78 the threaded fastener 46 may be tightened so as to draw the shank portion 40 upwardly through the bore 22 thus causing the outer surfaces of the collet fingers 32 to engage the downwardly divergent surfaces 20 of the recess 18. Then, continued movement of the shank portion 40 upwardly through the bore 22 will of course cause the downwardly divergent surfaces 20 of the recess 18 to wedge the collet segments 32 inwardly toward tight embracing engagement with the ball hitch element 78.

In this manner it may be seen that the hitch construction 10 may be utilized in conjunction with ball hitch elements of slightly different sizes and also that a positive action is provided for the collet segments 32 in that once they are radially inwardly contracted around the ball hitch element 78 they cannot be moved to the expanded positions for disengagement from the ball hitch element 78 until such time as the threaded fastener 46 is loosened.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collet-type socket hitch comprising a body portion adapted to be supported from the forward end of a trailer tongue, said body portion including a downwardly opening recess, a plurality of collet segments disposed in and spaced circumferentially about said recess, said segments including coacting inwardly facing surfaces and being vertically movable in said recess, said segments being movable between radially expanded lower positions and radially contracted upper positions, the outwardly facing surfaces of said segment and the walls of said recess, upon movement of said segments toward said upper positions, coacting to wedge said segments radially inwardly of said recess, the inwardly facing surfaces of said segments, when the latter are in upper positions, defining a downwardly opening partially closed socket adapted to captively and rotatably receive a ball hitch element, means connected between said segments and said body portion operable to raise said segments in said recess, said recess being defined by the lower end of an upstanding bore extending through said body portion, said means connected between said segments and said body portion including an upstanding elongated shank longitudinally reciprocal in and projecting upwardly from and downwardly into said bore, means operatively connecting the upper ends of said segments and the lower end portion of said shank for movement of said segments with said shank as the latter moves upwardly through said bore, the upper end of said bore including a counterbore whose bottom, outwardly of said bore, defines a first bearing race, the upper end portion of said shank having an abutment mounted thereon for engagement with said body and for adjustable movement of said shank longitudinally thereof, said abutment including a diametrically reduced portion on its lower end guidingly receivable in said bore and a diametrically larger upper portion including a downwardly facing shoulder defining a second bearing race opposing said first race, and a plurality of bearings disposed between said races.

2. The combination of claim 1 wherein at least the upper end portion of said shank is externally threaded and said abutment includes an upstanding threaded bore and is threadedly engaged with the upper end portion of said shank.

3. The combination of claim 2 wherein said diametrically reduced portion and the portion of said body defining said bore include coacting detent means operable to releasably retain said abutment in adjusted rotated positions relative to said body.

References Cited by the Examiner

UNITED STATES PATENTS

| | | | |
|---|---|---|---|
| 131,829 | 10/1872 | Pratt | 279—39 |
| 323,989 | 8/1885 | Washburn | 279—39 |
| 408,364 | 8/1889 | Traut | 215—54 X |
| 1,834,548 | 12/1931 | Noble | 215—54 X |
| 2,874,976 | 2/1959 | Linn | 280—512 |
| 3,006,673 | 10/1961 | Swick | 287—87 |
| 3,015,403 | 1/1962 | Fuller | 215—54 X |
| 3,158,411 | 11/1964 | Moulin | 279—39 X |

FOREIGN PATENTS

| | | |
|---|---|---|
| 718,118 | 4/1931 | France. |
| 117,245 | 2/1901 | Germany. |
| 511,173 | 10/1930 | Germany. |

BENJAMIN HERSH, *Primary Examiner.*

A. HARRY LEVY, *Examiner.*

C. C. PARSONS, *Assistant Examiner.*